United States Patent
Iwami

(10) Patent No.: US 6,815,521 B2
(45) Date of Patent: Nov. 9, 2004

(54) MULTI-PIECE GOLF BALL

(75) Inventor: Satoshi Iwami, Kobe (JP)

(73) Assignee: Sumitomo Rubber Industries Limited, Kobe (JP)

(*) Notice: Subject to any disclaimer, the term of this patent is extended or adjusted under 35 U.S.C. 154(b) by 35 days.

(21) Appl. No.: 10/262,942

(22) Filed: Oct. 3, 2002

(65) Prior Publication Data

US 2003/0104879 A1 Jun. 5, 2003

(30) Foreign Application Priority Data

Oct. 3, 2001 (JP) ........................................ 2001-307885

(51) Int. Cl.$^7$ .............................................. A63B 37/12
(52) U.S. Cl. ........................... 528/63; 528/64; 473/374; 473/377
(58) Field of Search ...................... 528/63, 64; 473/374, 473/377

(56) References Cited

U.S. PATENT DOCUMENTS

| 4,884,814 | A | | 12/1989 | Sullivan |
| 6,117,024 | A | * | 9/2000 | Dewanjee ................ 473/351 |
| 6,486,261 | B1 | * | 11/2002 | Wu et al. ............... 525/332.6 |
| 6,520,870 | B2 | * | 2/2003 | Tzivanis et al. ........... 473/371 |
| 2002/0019269 | A1 | * | 2/2002 | Walanabe ................ 473/370 |

FOREIGN PATENT DOCUMENTS

| EP | 0 467 622 B1 | 1/1992 |
| JP | 9-215778 A | 8/1997 |

OTHER PUBLICATIONS

Thain, Science and Golf IV, p. 319–327, 2002.*

* cited by examiner

*Primary Examiner*—David J. Buttner
(74) *Attorney, Agent, or Firm*—Birch, Stewart, Kolasch & Birch, LLP

(57) ABSTRACT

A multi-piece golf ball with a two-part curing type polyurethane cover is provided, which is satisfactory in moldability and ball characteristics such as a abrasion resistance and a carry. The multi-piece golf ball according to this invention has a core having an increased diameter and provided with a hardness difference between its surface portion and its central portion. This feature imparts the multi-piece golf ball with such characteristics as a high repulsion property, high shot angle and low spin count, thereby making the golf ball ensure an increased carry. The polyurethane cover of the multi-piece golf ball, which is formed from a two-part curing type polyurethane including a specific isocyanate group-terminated urethane prepolymer and an aromatic polyamine compound, is excellent in durability and abrasion resistance.

13 Claims, No Drawings

MULTI-PIECE GOLF BALL

BACKGROUND OF THE INVENTION

1. Field of the Invention

The present invention relates to a multi-piece golf ball having a multi-layered core covered with a polyurethane cover.

2. Description of the Related Art

An ionomer resin cover is mainly used for a cover of a golf ball employing a vulcanized rubber sphere as its core because the ionomer cover has superior durability. A golf ball with the ionomer resin cover, however, gives a golfer a larger impact upon shot than do a golf ball with Balata rubber cover, and hence tends to impart an inferior shot feeling to the golfer.

In attempt to improve the shot feeling imparted by the golf ball with the ionomer cover, Japanese Patent No. 2709950, for example, has proposed a mixed ionomer cover formed from a mixture of a hard ionomer comprising a sodium salt or zinc salt of an olefin-unsaturated carboxylic acid copolymer and a soft ionomer comprising a sodium salt or zinc salt of an olefin-unsaturated carboxylic acid-unsaturated carboxylic acid ester terpolymer. Blending of the soft ionomer with the hard ionomer makes it possible to render the shot feeling soft, but on the other hand, sacrifices the advantages inherent in the ionomer cover, such as the repulsion property as well as the abrasion resistance (chunking property) of the golf ball.

In recent years, polyurethane has been focused on as an inexpensive cover material that imparts to the golfer a shot feeling analogous to that imparted by the Balata cover and has higher durability than the Balata cover. For example, the following golf balls having polyurethane covers have been proposed.

Japanese Patent No. 2662909 has disclosed a polyurethane cover formed by curing a urethane prepolymer with a slow-reactive polyamine curing agent, in view of a problem that it is difficult to mold the polyurethane cover because the rapid reaction between the urethane prepolymer and polyamine curing agent results in a precipitous increase in viscosity. The use of the slow-reactive polyamine curing agent suppresses a steep increase in viscosity which would otherwise occur due to the reaction rapidly proceeding between the urethane prepolymer and the conventional polyamine curing agent. However, it is still difficult to mold the polyurethane cover, because of the rapid increase in viscosity, depending on the some type of urethane prepolymer, some kinds of curing agent, some combinations of urethane prepolymer and curing agent, or the like. Even when the polyurethane cover could be formed, the repulsion property, spin performance and chunking property are not sufficient. Thus, further improvements are required.

Japanese unexamined Patent Publication No. H09-215778 has proposed a cover using a thermoplastic polyurethane elastomer. The cover using a thermoplastic polyurethane elastomer is superior in moldability to the two-part curing type polyurethane cover, but is inferior in wear resistance, tear strength and abrasion resistance (chunking property) to the two-part curing type polyurethane cover or the ionomer cover, due to the lack of three-dimensional crosslinking points.

The present invention has been achieved in view of the foregoing circumstances. It is therefore an object of the present invention to provide a multi-piece golf ball with a two-part curing type polyurethane cover, which is satisfactory in moldability and the golf ball properties such as abrasion resistance and a flight distance.

SUMMARY OF THE INVENTION

According to the present invention, there is provided a multi-piece golf ball comprising a core including a center and at least one intermediate layer covering the center; and a polyurethane cover covering the core, wherein the polyurethane cover has a thickness of not more than 1 mm and is formed from a cured composition which contains an isocyanate group-terminated urethane prepolymer having a residual polyisocyanate monomer content of not more than 0.1% by mass and an aromatic polyamine compound;

the core has an outer diameter of from 40.8 mm and 42.2 mm;

a difference in Shore D hardness between the central portion and the surface portion of the center is not less than 15;

a difference in Shore D hardness between the central portion of the center and the surface portion of the core is not less than 20; and a Shore D hardness at the surface portion of the core is higher than a Shore D hardness at the surface portion of the center. The foregoing and other objects, features and attendant advantages of the present invention will become apparent from the reading of the following detailed description.

DETAILED DESCRIPTION OF THE PREFERRED EMBODIMENTS

The present invention will now be described in detail. The multi-piece golf ball of the present invention is characterized by comprising a core including a center and at least one intermediate layer covering the center; and a polyurethane cover covering the core, wherein the polyurethane cover has a thickness of not more than 1 mm and is formed from a cured composition which contains an isocyanate group-terminated urethane prepolymer having a residual polyisocyanate monomer content of not more than 0.1% by mass and an aromatic polyamine compound (hereinafter referred to as "urethane cover composition"); and the core has an outer diameter of from 40.8 mm and 42.2 mm;

a difference in Shore D hardness between the central portion and the surface portion of the center is not less than 15;

a difference in Shore D hardness between the central portion and the surface portion of the core is not less than 20; and a Shore D hardness at the surface portion of the core is higher than a Shore D hardness at the surface portion of the center.

The polyurethane cover used in the present invention is described first. The polyurethane cover is composed of a cured urethane cover composition. The urethane cover composition contains the isocyanate group-terminated urethane prepolymer having a residual polyisocyanate monomer content of not more than 0.1% by mass and the aromatic polyamine compound.

The isocyanate group-terminated urethane prepolymer used in the present invention may include
any isocyanate group-terminated urethane prepolymer having at least two isocyanate groups in a urethane prepolymer molecular chain thereof. Each isocyanate group in a urethane prepolymer molecular chain may be located at the terminal of the backbone chain or at the terminal of a side chain, without limitation.

The isocyanate group-terminated urethane prepolymer is prepared by reacting a polyisocyanate compound with a polyol so that the isocyanate group of the polyisocyanate compound is excess relative to the hydroxyl group of the polyol in molar ratio. In the present invention, the residual polyisocyanate monomer content of the isocyanate group-terminated urethane prepolymer is not more than 0.1% by mass. The "residual polyisocyanate monomer", as used herein, means an unreacted polyisocyanate compound remaining in the isocyanate group-terminated urethane prepolymer. For example, the excess polyisocyanate compound which is used for preparing the isocyanate group terminated urethane prepolymer partially remains unreacted, resulting in the residual polyisocyanate monomer. If the content of the residual polyisocyanate monomer is more than 0.1% by mass, the urethane cover composition tends to generate a precipitate therein. Though the mechanism of the formation of the precipitate is not apparent, it can be presumed that the reaction product of the residual polyisocyanate monomer and the polyamine curing agent precipitates. The generation of the precipitate causes a non-uniform reaction between the isocyanate group-terminated urethane prepolymer and the polyamine curing agent, thus making it difficult to form a uniform polyurethane cover. A non-uniform polyurethane cover will affect the cover durability, in particular, will lower the abrasion resistance (chunking properties). In an extreme case, the cover composition is cured before molding the cover composition, thus it is substantially impossible to mold the cover.

The content of the residual polyisocyanate monomer in the isocyanate group-terminated urethane prepolymer is defined by the expression: (the mass of the residual polyisocyanate monomer in the isocyanate group-terminated urethane prepolymer/the total mass of the isocyanate group-terminated urethane prepolymer)×100, and can be determined by gas chromatography. Specific example of the isocyanate group-terminated urethane prepolymer having a residual polyisocyanate monomer content of not more than 0.1% by mass includes ADIPRENE LF600D, LF800A, LF900A and LF950A commercially available from Uniroyal Co.

The isocyanate group-terminated urethane prepolymer has no limitation on isocyanate component. Examples of the isocyanate compound as the isocyanate component include, but not limited to, an aromatic diisocyanate such as 2,4-tolylene diisocyanate, 2,6-tolylene diisocyanate or a mixture thereof (TDI), 4,4'-diphenylmethane diisocyanate or a polynuclear compound thereof, 1,5-naphthylene diisocyanate (NDI), 3,3'-bitolylene-4,4'-diisocyanate (TODI), xylylene diisocyanate (XDI) and paraphenylene diisocyanate (PPDI); and an alicyclic or aliphatic diisocyanate such as 4,4'-dicyclohexylmethane diisocyanate (hydrogenated MDI), hexamethylene diisocyanate (HDI) and isophorone diisocyanate (IPDI), or mixtures of at least two of them.

Preferably, the isocyanate component is derived from at least one isocyanate compound selected from the group consisting of tolylene diisocyanate, 4,4'-diphenylmethane diisocyanate (MDI) and paraphenylene diisocyanate (PPDI), among the aforementioned isocyanate compounds. This is because the resulting polyurethane cover has favorable mechanical properties and because the golf ball with the resulting polyurethane cover is satisfactory in repulsion property, weather resistance and water resistance.

The polyol component of the isocyanate group-terminated urethane prepolymer may include any polyol having a plurality of hydroxyl groups regardless of whether the polyol has low-molecular-weight or high-molecular-weight. Examples of the low-molecular-weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high-molecular-weight polyol include a polyetherpolyol generally resulting from the reaction between an initiator having active hydrogen and alkylene oxide; a condensed polyesterpolyol generally resulting from the dehydration-condensation between a dibasic acid, such as adipic acid, and a glycol or a triol; a lactone polyesterpolyol generally resulting from ring opening polymerization of a lactam such as ε-caprolactam; a polycarbonate diol generally synthesized using a cyclic diol; and a polymer polyol, such as an acrylic polyol, prepared by introducing an appropriate hydroxyl group into an acrylic copolymer. Examples of the polyetherpolyol include polyoxyethylene glycol(PEG), polyoxypropylene glycol (PPG), and polyoxytetramethylene glycol (PTMG). Examples of the condensed polyesterpolyol include polyethylene adipate (PEA), polybutylene adipate (PBA), and polyhexamethylene adipate (PHMA). Examples of the lactone polyesterpolyol include poly-ε-caprolactone (PCL). In view of the superior repulsion property and water resistance, the polyetherpolyol is preferable. Use of polyoxytetramethylene glycol (PTMG) is particularly preferable. Among the polyols mentioned above, polyoxytetramethylene glycol (PTMG) is preferably used.

Accordingly, the isocyanate group-terminated urethane prepolymer used in the present invention preferably comprises at least one selected from the group consisting of a tolylene diisocyanate urethane prepolymer, a MDI urethane prepolymer and a PPDI urethane prepolymer. The "tolylene diisocyanate urethane prepolymer", as used herein, means an isocyanate group-terminated urethane prepolymer resulting from the reaction between tolylene diisocyanate or a polyisocyanate comprising a tolylene diisocyanate as a major component and a polyol (preferably polytetramethylene glycol). The "MDI urethane prepolymer", as used herein, means an isocyanate group-terminated urethane prepolymer resulting from the reaction between MDI or a polyisocyanate comprising MDI as a major component and a polyol (preferably polytetramethylene glycol). The "PPDI urethane prepolymer", as used herein, means an isocyanate group-terminated urethane prepolymer resulting from the reaction between PPDI or a polyisocyanate comprising PPDI as a major component and a polyol (preferably polytetramethylene glycol).

The aromatic polyamine compound used in the present invention includes any compound having at least two amino groups directly or indirectly bonded to aromatic ring(s) without any particular limitation. Herein, the expression "indirectly bonded", for example, means a state where an amino group is bonded to an aromatic ring through a lower alkylene group. The aromatic polyamine compound may include a monocyclic aromatic polyamine compound having at least two amino groups bonded to one aromatic ring or a polycyclic aromatic polyamine compound having at least two aminophenyl groups each having at least one amino group bonded to one aromatic ring.

Examples of the monocyclic aromatic polyamine compound include the aromatic polyamine compound in which the amino group is directly bonded to the aromatic ring, such as phenylenediamine, toluenediamine, diethyltoluenediamine and dimethylthiotoluenediamine; and the aromatic polyamine compound in which the amino group is bonded to the aromatic ring through a lower alkylene group, such as xylylenediamine. Use of dimethylthiotoluenediamine or diethyltoluenediamine is particularly preferable, because they have moderate reactivity with the isocyanate group-terminated urethane prepolymer.

The polycyclic aromatic polyamine compound may include a polyaminobenzene in which at least two aminophenyl groups are directly bonded to each other and an aromatic polyamine compound where at least two aminophenyl groups are bonded to each other through a lower alkylene group or an alkylene oxide group. Among them, diaminodiphenylalkane having two aminophenyl groups bonded to each other through a lower alkylene group is preferable. Particularly preferable are 4,4'-diaminodiphenylmethane represented by the following general formula and derivatives thereof.

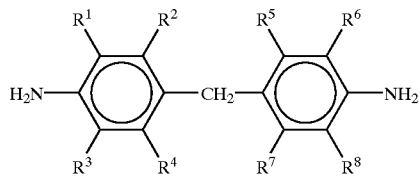

wherein $R^1$ to $R^8$ each represent any one of an alkyl group having 1 to 9 carbon atoms, a halogen atom and a hydrogen atom.

In the case of p-isomers in which the molecular chain between the aminophenyl groups is not so long, the benzene nuclei in the hardsegments can be arranged side-by-side linearly in a plane, and hence it is possible to efficiently make use of the intermolecular cohesive energy between benzene nuclei. As a result, the resilience is improved. In addition, the cover durability and the cover strength such as chunking properties tend to be improved.

Examples of the derivatives of 4,4'-diaminodiphenylmethane include 3,3'-dichloro-4,4'-diaminodiphenylmethane, 3,3'-dimethyl-5,5'-diethyl-4,4'-diaminodiphenylmethane, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 3,3'-dichloro-5,5'-diethyl-4,4'-diaminodiphenylmethane, 2,2'-dichloro-3,3',5,5'-tetraethyl-4,4'-diaminodiphenylmethane, and 2,2',3,3'-tetrachloro-4,4'-diaminodiphenylmethane. Among them, 2,2'-dichloro-3,3',5,5'-tetraethyl-4,4'-diaminodiphenylmethane is particularly preferable because its toxicity is low.

Although the blending ratio of the aromatic polyamine compound and the isocyanate group-terminated urethane prepolymer contained in the urethane cover composition is not particularly limited, the aromatic polyamine compound is preferably blended with the isocyanate group-terminated urethane prepolymer so that the molar ratio of the amino group to the isocyanate group ($NH_2$/NCO) falls within the range of from 0.7 to 1.2, preferably from 0.8 to 1.05, more preferably from 0.85 to 1.0. If the blending ratio is adjusted so that a cured urethane cover composition has a buret crosslinking or allophanate crosslinking, the polyurethane cover has a three-dimensional crosslinking structure and hence exhibits superior durability and abrasion resistance.

The urethane cover composition used in the present invention may further contain any well-known catalyst conventionally used for a urethane reaction. Examples of the catalyst include a monoamine such as triethylamine and N,N-dimethylcyclohexylamine; a polyamine such as N,N,N',N'-tetramethylethylenediamine and N,N,N',N'',N''-pentamethyldiethylenetriamine; a cyclic diamine such as 1,8-diazabicyclo[5,4,0]-7-undecene (DBU) and triethylenediamine; and a tin catalyst such as dibutyltin dilaurylate and dibutyltin diacetate. Among them, 1,8-diazabicyclo[5,4,0]-7-undecene (DBU) and triethylenediamine are preferable. In the case where the reactivity of the isocyanate group is too high (rapid), there may be used a reactivity regulating (retarding) catalyst, examples of which include organic carboxylic acids such as acetic acid, azelaic acid, oleic acid and adipic acid. Among them, azelaic acid is preferably used.

As required, the urethane cover composition may further contain a filler such as barium sulfate, a coloring agent such as titanium dioxide, and other additives such as a dispersant, an antioxidant, an ultraviolet absorber, a light stabilizer, a fluorescent material, and a fluorescent brightener as long as the desired properties of the golf ball are not thereby deteriorated. Since the preparation of the urethane cover composition needs homogeneous mixing of the isocyanate group-terminated urethane prepolymer and the aromatic polyamine compound, the two materials are preferably heated and mixed at such a temperature where the aromatic polyamine compound is in a molten state. Therefore, the urethane prepolymer is heated around the temperature where the aromatic polyamine compound turns into a molten state, and then the urethane prepolymer is mixed with the aromatic polyamine compound in a molten state.

The hardness of the cured urethane cover composition (the hardness of the cured urethane cover composition may be referred to as "slab hardness") to be used as the polyurethane cover of the multi-piece golf ball of the present invention is not less than 35, preferably not less than 40 by Shore D hardness. If the Slab hardness is less than 35, the resulting polyurethane cover will be too soft, resulting in the lowered repulsion property as well as lowered abrasion resistance (chunking property). On the other hand, the larger slab hardness means the harder cover. Since the excessively hard cover results in the golf ball which imparts a hard shot feeling to the golfer and which cannot ensure the satisfactory controllability in approach shot because of too low spin rate. For this reason, the Shore D hardness of the cured urethane cover composition is preferably not more than 60, more preferably not more than 55. In the present invention, the polyurethane cover has the thickness of not more than 1.0 mm, and preferably not more than 0.9 mm. If the thickness is more than 1 mm, the golf ball with the polyurethane cover exhibits a lowered repulsion property and hence offers a reduced flight distance. The lower limit of the thickness of the polyurethane cover is preferably 0.3 mm, more preferably 0.5 mm. If the polyurethane cover is less than 0.3 mm, the polyurethane cover cannot provide durability, abrasion resistance and the like sufficiently.

The inventor of the present invention has found that a golf ball can be imparted with the properties such as high repulsion property, high shot angle and low spin rate and hence can offer a longer carry, if the core of the multi-piece golf ball has an increased diameter and is provided with a difference in Shore D hardness between the surface portion and the central portion. By making the core multi-layered, it is possible to provide the difference in hardness between the central portion and the surface portion of the core easily. Further, by adjusting the respective compositions and thicknesses of the center and the intermediate layer, it is possible to widen the degree of freedom in providing a hardness distribution, hence to provide a considerably large difference in hardness between the central portion and the surface portion of the core.

According to the present invention, the core is a multi-layered core including a center formed of a vulcanized rubber sphere and at least one intermediate layer covering the center. The core preferably has the outer diameter of not less than 40.8 mm, more preferably not less than 41.0 mm, most preferably not less than 41.2 mm, but preferably has the diameter of not more than 42.2 mm, preferably not more than 42.0 mm, and most preferably not more than 41.8 mm. If the outer diameter of the core is less than 40.8 mm, the polyurethane cover will be too thick, resulting in a lowered repulsion. Further, it will become difficult to provide the difference in hardness within the core. On the other hand, if the outer diameter of the core is more than 42.2 mm, the polyurethane cover will be too thin. Thus, it is difficult to take advantages of the features of the polyurethane cover, and it is also difficult to mold the cover.

In the present invention, the difference in Shore D hardness between the surface portion of the core and the central portion of the core is at least 20, preferably at least 23, and is preferably not more than 40, more preferably not more than 35. Herein, the hardness at the central portion (hereinafter may be referred to as "central hardness") of the core equals to the central hardness of the center.

The core is getting softer towards the central portion thereof, and the hardness of the surface portion (hereinafter may be referred to as "surface hardness") of the core is higher than the hardness of the surface portion of the center. If the difference in hardness is less than 20 or if the surface hardness of the core is lower than the surface hardness of the center, the resulting golf ball cannot be imparted with the properties such as high repulsion property, high shot angle and low spin rate, and hence cannot offer a longer flight distance.

The core preferably has the deformation amount of not less than 2.70 mm, more preferably not less than 2.80 mm, most preferably 2.9 mm, and preferably has the deformation of not more than 3.50 mm, more preferably not more than 3.40 mm, most preferably not more than 3.30 mm, when applying a load varying from 98 N as an initial load to 1275 N as a final load to the core. The deformation amount indicates the softness of the core as a whole. If the deformation amount is less than 2.70 mm, the shot feeling becomes hard, while on the other hand, if the deformation is more than 3.50 mm, the resulting golf ball is so soft that the shot feeling becomes heavy.

In the present invention, the center forming a centeral part of the core is composed of a vulcanized rubber sphere. The center preferably has the outer diameter of not less than 30.0 mm, more preferably not less than 31.0 mm, most preferably 31.2 mm, and preferably has the outer diameter of not more than 40.8 mm, more preferably not more than 40.2 mm, most preferably not more than 39.8 mm. If the outer diameter of the vulcanized rubber sphere is less than 30.0 mm, the center is so small that it is difficult to provide a desired difference in hardness between the central portion and the surface portion of the center. On the other hand, if the outer diameter of the vulcanized rubber sphere is more than 40.8 mm, the intermediate layer and the cover will be too thin, because the size of a golf ball is specified. Thus, it will be difficult to mold the intermediate layer and the cover.

Regarding the center, the difference in the Shore D hardness between the central portion and the surface portion of the center is at least 15, and the center is getting softer towards the central portion.

The difference in Shore D hardness is preferably not less than 16 and not more than 25, more preferably not more than 20. If the difference in hardness is less than 15, the satisfactory soft shot feeling cannot be obtained. If the center is provided with the difference in hardness more than 25, it is no preferable because the surface hardness of the center accidentally becomes higher than the surface hardness of the core.

The center has no limitation, as long as the center meets the aforementioned requirements, and preferably has Shore D hardness of from 30 to 50 at the central portion, more preferably Shore D hardness of from 35 to 48, most preferably Shore D hardness of from 38 to 45. If the Shore D hardness at the central portion is less than 30, the center becomes too soft, resulting in the lower repulsion property, or heavy and uncomfortable shot feeling. On the other hand, if Shore D hardness at the central portion is more than 50, the center is so hard that the resulting golf ball gives the golfer a large impact upon shot. The surface hardness of the center preferably falls within the range of from 45 to 75, more preferably from 50 to 70.

The center preferably has the deformation amount of not less than 2.80 mm, more preferably not less than 2.90 mm, and preferably has the deformation amount of not more than 4.00 mm, more preferably not more than 3.80 mm, most preferably not more than 3.50 mm, when applying a load varying from 98 N as an initial load to 1275 N as a final load to the center. The deformation amount of the center indicates the softness of the center as a whole. By adjusting the deformation amount of the center and the difference in hardness between the surface portion and the central portion of the center to fall within respective range stated above, it is possible to obtain a golf ball having an enhanced repulsion property while ensuring a soft shot feeling to the golfer when hit with a wood or an iron.

The rubber composition used as the material for the center may include any rubber composition that has been conventionally used for the center of the general multi-piece golf ball. Specifically, the rubber composition comprises a base rubber such as butadiene rubber (BR), ethylene-propylene-diene terpolymer (EPDM), isoprene rubber (IR), styrene-butadiene rubber (SBR), or acrylonitrile-butadiene rubber (NBR), an unsaturated carboxylic acid and/or a metal salt thereof as a co-crosslinking agent, an organic peroxide as a crosslinking initiator, and optionally other additives such as a specific gravity adjustor.

Examples of the organic peroxide include dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferably used. The organic peroxide is preferably blended in an amount of from 0.1 to 3.0 parts by mass, more preferably from 0.2 to 2.0 parts by mass, based on 100 parts by mass of the base rubber.

Preferable as the unsaturated carboxylic acid is an $\alpha,\beta$-unsaturated carboxylic acid having 3 to 8 carbon atoms such as acrylic acid or methacrylic acid. A preferable metal salt of the unsaturated carboxylic acid is a monovalent or bivalent metal salt of the unsaturated carboxylic acid such as a zinc salt or magnesium salt of the unsaturated carboxylic acid. The unsaturated carboxylic acid and/or a metal salt thereof is preferably blended in an amount of from 15 to 40 parts by mass, particularly from 20 to 35 parts by mass, based on 100 parts by mass of the base rubber. Though the vulcanization conditions for the center rubber composition are appropriately established depending on the formulation of the center rubber composition, vulcanization is preferably performed at 150° C. to 170° C. for 10 to 30 minutes in order to obtain the center having the foregoing hardness distribution. It should be noted that two-step vulcanization, for example, yields a core having a narrower hardness distribution and hence is not preferable.

In the present invention, the intermediate layer formed on the foregoing center has no limitation, as long as the aforementioned surface hardness of the core is satisfied. Examples of materials for the intermediate layer include a vulcanizate of butadiene rubber (BR), ethylene-propylene-diene terpolymer (EPDM), isoprene rubber (IR), styrene-butadiene rubber (SBR) and acrylonitrile-butadiene rubber (NBR); a thermoplastic resin such as a polyurethane resin, an ionomer resin, nylon and polyethylene; and a thermoplastic elastomer such as a polystyrene elastomer, a polyolefin elastomer, a polyurethane elastomer and a polyester elastomer. Among them, the vulcanizate and the ionomer resin are particularly preferable in view of their superior repulsion property and durability. Examples of the ionomer resin include one prepared by neutralizing at least a part of carboxyl groups in a copolymer of ethylene-$\alpha,\beta$-unsaturated carboxylic acid with a metal ion, and one prepared by neutralizing at least a part of carboxyl groups in a terpolymer of ethylene-$\alpha,\beta$-unsaturated carboxylic acid-$\alpha,\beta$-unsaturated carboxylic acid ester with a metal ion. Examples of the $\alpha,\beta$-unsaturated carboxylic acid include acrylic acid, methacrylic acid, fumaric acid, maleic acid and crotonic acid. Among them, acrylic acid and methacrylic acid are particularly preferable. Examples of the $\alpha,\beta$-unsaturated carboxylic acid ester include methyl ester, ethyl ester, propyl ester, n-butyl ester and iso-butyl ester of acrylic acid, methacrylic acid, fumaric acid and maleic acid and the like. Among them, acrylic acid ester and methacrylic acid ester are particularly preferable. Examples of the metal ion for neutralizing the carboxyl group include sodium ion, potassium ion, lithium ion, magnesium ion, calcium ion, zinc ion, barium ion, aluminum ion, tin ion, zirconium ion and cadmium ion. Among them, sodium ion, zinc ion and magnesium ion are preferable because they provide for a golf ball having improved repulsion property and durability. In the present invention, there is no particular limitation on the acid value of the ionomer resin and on the metal ion content of the ionomer resin, and it is sufficient to use the ionomer resin alone or as a mixture of plural kinds of the ionomer resins so that the surface hardness of the resulting core meets the foregoing requirements. The intermediate layer may further be incorporated with a specific gravity adjustor such as barium sulfate or tungsten. If the filler is incorporated, it is sufficient for the material incorporated with the filler to satisfy the foregoing hardness requirements. The thickness of the intermediate layer can be determined based on the sizes of the core and the center.

The multi-piece golf ball of the present invention comprise the core having the construction described above and the specific polyurethane cover covering the core. The multi-piece golf ball preferably has the deformation amount of not less than 2.50 mm, more preferably not less than 2.60 mm, much more preferably not less than 2.70 mm when applying a load varying from 98 N as an initial load to 1275 N as a final load to the golf ball. The upper limit of the deformation amount is preferably 3.20 mm, more preferably 3.10 mm, much more preferably 3.00 mm. A golf ball of which the deformation amount is less than 2.50 mm is so hard that the golfer hitting this golf ball is given too large an impact. On the other hand, a golf ball, of which the deformation amount is more than 3.20 mm, is so soft that the time period between the club face contacts to the golf ball and releases the golf ball is long, resulting in the heavy shot feeling.

In measurement of the compressive deformation amount of the golf ball, the golf ball preferably has the outer diameter of not less than about 40 mm, more preferably not less than 40.8 mm, even more preferably not less than 42.67 mm, and preferably has the outer diameter of not more than about 45 mm, more preferably not more than 44.2 mm, much more preferably not more than 42.80 mm. Although the outer diameter of the golf ball is limited to 42.67 mm or more according to golf ball standards, the outer diameter of an ordinary golf ball is set to fall within the range of from 42.67 mm and 42.80 mm because a golf ball having a larger outer diameter undergoes a larger air resistance when flying and hence offers a shorter flight distance. However, in view of the fact that there exist golf balls of the type having an increased outer diameter for allowing golfers to hit more easily and that golf balls of the type which does not conform to the standards are sometimes demanded to meet to the requirements and objects of customers, the outer diameter of the golf ball preferably falls within the range of from about 40 mm to about 45 mm, more preferably from 40.8 mm to 44.2 mm, in measuring the compressive deformation amount.

The multi-piece golf ball of the present invention can be manufactured by a well-known process conventionally employed to manufacture a golf ball covered with a polyurethane cover. For example, the center comprising the molded vulcanizate is covered with the intermediate layer to form the core. The covering with the intermediate layer may be conducted by, for example, a process comprising forming the material for forming the intermediate layer into two half shells previously, and enveloping the center with the two half shells, followed by pressure molding, or a process comprising injection-molding the material for forming the intermediate layer directly onto the center to cover the center. In turn, the urethane cover composition is charged into a hemispherical mold holding the core thus obtained, then the mold is inverted and mated with another hemispherical mold into which the urethane cover composition has been charged, and then a curing reaction is conducted to form the polyurethane cover. The curing reaction of the urethane cover composition is preferably conducted at a temperature of not lower than 20° C., more preferably not lower than 40° C., but preferably at the temperature of not higher than 100° C., more preferably not higher than 80° C. for 1 to 10 minutes, preferably 2 to 5 minutes. As required, the surface of the polyurethane cover is formed with a multiplicity of dimples at the same time with the molding of the cover. Further, the golf ball of the present invention is usually provided with paint finish, a marking stamp and the like to enhance the appearance and commercial value thereof before it is launched into the market. It is to be noted that the cover of the golf ball of the present invention may comprise a single layer or plural layers.

EXAMPLES

The following examples illustrate the present invention, however these examples are intended to illustrate the invention and are not to be construed to limit the scope of the present invention. Many variations and modifications are intended to be within the scope of the invention.

Measurement and Evaluation Methods

1. Compressive deformation amount (mm)

The deformation amount (deformation amount of shrinkage along the loading direction) was measured when applying a load varying from an initial load of 98 N to a final load of 1275 N to the center, the core or the golf ball to be measured.

2. Shore D hardnesses at the central portion and at the surface portion of the center, and Shore D hardness at the surface portion of the core Measurement was performed using a Shore D type spring hardness tester prescribed by ASTM-D2240. The hardness at the central portion of the center was determined by dividing the center into two halves; and then contacting a measuring-pick with the central portion of the cut surface (section) of the hemispherical halves. The surface hardness of the center was measured by contacting the measuring-pick with the surface of the center. The surface hardness of the core was measured by contacting the measuring-pick with the surface of the core in a state where the center was covered with an intermediate layer.

3. Hardness of a cured urethane cover composition (slab hardness)

The urethane cover compositions were each formed into sheets each having a thickness of about 2 mm by hot press molding and the resulting sheets were conserved at 23° C. for two weeks. Three or more of the sheets were stacked on one another to avoid being affected by the measuring substrate on which the sheets were placed, and the stack was subjected to measurement using the Shore D type spring hardness tester prescribed by ASTM-D2240.

4. Flying performance of the golf ball

Golf balls were each hit with a wood (W#1) attached to a swing robot manufactured by TRUETEMPER CO. at the head speed of 50 m/sec. The shot angle (°), spin rate (rpm) and flight distance(carry: the distance (yd) from the hitting point to the point where the ball fell to the ground) were measured when the golf ball was hit. The flight distance of the golf ball was represented as an index relative to the repulsion coefficient of the golf ball No. 1, which was represented as 100.

5. Abrasion resistance (chunking property)

Two portions of each golf ball were each hit once using a commercially available pitching wedge attached to the swing robot at the head speed of 36 m/sec. The condition of each of the two portions thus hit was visually observed and rated on three levels according to the following criteria. The worse result of the two ratings was regarded as the result of the golf ball. Rating criteria:

"G(good)": There were a few scratches, which were barely noticeable on the surface of the golf ball.

"F(Fair)": There were clearly noticeable scratches and some scuffing on the surface of the golf ball.

"P(Poor)": The surface of the golf ball was torn, with obvious scuffing.

6. Repulsion coefficient

Each golf ball was struck with a 200 g of aluminum cylinder at the speed of 45 m/s, the speed of the cylinder and the golf ball were respectively measured before and after being struck, and the repulsion coefficient of the golf ball was calculated based on the speeds and weight of the cylinder and the golf balls. The measurement was carried out 5 times, and the average of 5 times was regarded as the repulsion coefficient of the golf ball. The repulsion coefficient of the golf ball was represented as an index relative to the repulsion coefficient of the golf ball No. 1, which was represented as 100.

Manufacture of Golf Ball

Each of the center rubber compositions (S1 to S4) shown in Table 1 was formed into a center. The vulcanization conditions are shown in Table 1.

TABLE 1

| Type of Center | S1 | S2 | S3 | S4 |
|---|---|---|---|---|
| Center composition | — | — | — | — |
| BR18 | 100 | 100 | 100 | 100 |
| Zinc acrylate | 33 | 33 | 30 | 33 |
| Zinc oxide | 11.5 | 11.5 | 12.5 | 11.5 |
| Diphenyl disulfide | 0.5 | 0.5 | 0.5 | 0.5 |
| Dicumyl peroxide | 0.8 | 0.8 | 0.8 | 0.8 |
| Properties of Center | — | — | — | — |
| Outer diameter (mm) | 33.6 | 39.4 | 33.6 | 33.6 |
| Central Hardness (Shore D) | 33 | 37 | 47 | 37 |
| Surface Hardness (Shore D) | 52 | 58 | 50 | 50 |
| Hardness difference (Surf.-Cent.) | 19 | 21 | 3 | 13 |
| Deformation amount (mm) | 3.50 | 2.95 | 3.40 | 3.25 |
| Vulcanization condition ° C. × min. | 170° C. × 15 min | 170° C. × 15 min | 140° C. × 20 min + 165° C. × 8 min | 160° C. × 18 min | unit: parts by mass

In table 1, a high-cis polybutadiene BR-18 produced by JSR Co. was used as a butadiene rubber; diphenyl disulfide by SUMITOMO SEIKA CHEMICALS CO., LTD. was used as the diphenyl disulfide, and a product of NOF CORPORATION. was used as the dicumyl peroxide. The center thus formed was covered with each of the intermediate layer compositions (M1 to M4) shown in Table 2, to form a double-layered core.

TABLE 2

| Type of Intermediate Layer | M1 | M2 | M3 | M4 |
|---|---|---|---|---|
| Ingredient | — | — | — | — |
| BR-18 | 80 | 80 | — | 80 |
| BR-10 | 20 | 20 | — | 20 |
| Zinc acrylate | 37 | 35 | — | 35 |
| Zinc oxide | 10.7 | 11 | — | 11 |
| Dicumyl peroxide | 0.5 | 0.7 | — | 0.7 |
| Himilan 1605 | — | — | 60 | — |
| Himilan 1706 | — | — | 40 | — |
| Surface hardness (Shore D) | 61 | 57 | 70 | 52 |
| Vulcanization condition ° C. × min. | 170° C. × 16 min. | | — | 160° C. × 18 min |

Unit: parts by mass

In Table 2, BR-18 and BR-10 are high-cis polybutadiene rubbers produced by JSR Co; HIMILAN 1605 is a sodium ion-neutralized ethylene-methacrylic acid type ionomer resin produced by MITSUI-DUPONT POLYCHEMICALS CO., LTD.; and HIMILAN 1706 is a zinc ion-neutralized ethylene-methacrylic acid type ionomer resin produced by MITSUI-DUPONT POLYCHEMICALS CO., LTD.

Each of the core thus formed was covered with each of cover compositions (C1 to C4) shown in Table 3 to form golf balls Nos. 1 to 13 each having a diameter of 42.8 mm and a mass of 45.4 g.

TABLE 3

| Cover composition | | C1 | C2 | C3 | C4 |
|---|---|---|---|---|---|
| Isocyate group terminated urethane prepolymer | Adiprene LF900A | 100 | 50 | — | — |
| | Adiprene LF950A | — | 50 | — | — |
| | Vibrathane B635 | — | — | 50 | — |
| | Vibrathane B670 | — | — | 50 | — |
| Aromatic polyamine compound | Lonzacure M-CDEA | 15.8 | 20.9 | 48.3 | — |
| | Elasmer 250P | — | — | — | — |
| Thermoplastic urethane resin | Pandex T1198 | — | — | — | 100 |
| Filler | Titanium oxide | 2 | 2 | 2 | 2 |
| Curing Conditions | Curing time (min.) | 10 | 10 | 10 | — |
| | Mold (curing) temp. (° C.) | 80 | 80 | 80 | — |
| | Prepolymer temp. (° C.) | 80 | 80 | 80 | — |
| | Curing agent temp. (° C.) | 120 | 120 | 120 | — |
| Cover hardness | Slab hardness (Shore D) | 42 | 47 | 52 | 53 |

Note on Table 3:
ADIPRENE LF900A: a TDI (NCO content = 3.7%) - PTMG type prepolymer having a free TDI content of not more than 0.1% produced by UNIROYAL CO.;

TABLE 3-continued

| Cover composition | C1 | C2 | C3 | C4 |
|---|---|---|---|---|

ADIPRENE LF950A: a TDI (NCO content = 6.1%) - PTMG type prepolymer having a free TDI content of not more than 0.1% produced by UNIROYAL CO.;
VIBRATHANE B635: an MDI (NCO content = 7.8%) - PTMG type prepolymer having a free MDI content of more than 0.1% produced by UNIROYAL CO.;
VIBRATHANE B670 is an MDI (NCO content = 11.2%) - PTMG type prepolymer having a free MDI content of more than 0.1% produced by UNIROYAL CO.;
LONZACURE M-CDEA: 4,4'-methylenebis(3-chloro-2,6-diethylaniline), or (2,2'-dichloro-3,3',5,5'-tetraethyl-4,4'-diaminodiphenylmethane) having an amine number of 297 mgKOH/g, produced by UNIROYAL CO.;
ELASMER 250P: polytetramethylene oxide aminobenzoate having an amine number of 249.4 mgKOH/g produced by AIR PRODUCTS CO.;
PANDEX T1198: an adipate-type thermoplastic polyurethane elastomer produced by DAINIPPON INK AND CHEMICALS, INCORPORATED.

The structures and characteristics of golf balls Nos. 1 to 6 obtained are shown in Table 4, while the structures and characteristics of golf balls Nos. 7 to 13 obtained are shown in Table 5.

TABLE 4

| Golf ball No. | 1 | 2 | 3 | 4 | 5 | 6 |
|---|---|---|---|---|---|---|
| Center | — | — | — | — | — | — |
| Type of Center | S1 | S1 | S1 | S2 | S2 | S2 |
| Surface hardness (Shore D) | 52 | 52 | 52 | 58 | 58 | 58 |
| Hardness difference (Surf-Cent.) | 19 | 19 | 19 | 21 | 21 | 21 |
| Core | — | — | — | — | — | — |
| Type of Intermediate Layer | M1 | M1 | M1 | M3 | M3 | M3 |
| Outer diameter (mm) | 41.2 | 41.2 | 41.8 | 41.2 | 41.2 | 41.8 |
| Surface hardness (Shore D) | 60 | 60 | 61 | 70 | 70 | 70 |
| Hardness difference (Surf-Cent.) | 27 | 27 | 28 | 33 | 33 | 33 |
| Deformation (mm) | 2.80 | 2.80 | 2.75 | 2.70 | 2.70 | 2.60 |
| Cover | — | — | — | — | — | — |
| Type of cover | C1 | C2 | C2 | C1 | C2 | C2 |
| Thickness (mm) | 0.8 | 0.8 | 0.5 | 0.8 | 0.8 | 0.5 |
| Slab hardness (Shore D) | 42 | 47 | 47 | 42 | 47 | 47 |
| Ball properties | — | — | — | — | — | — |
| Deformation (mm) | 2.65 | 2.60 | 2.66 | 2.59 | 2.55 | 2.61 |
| Repulsion Index | 100 | 101 | 102 | 102 | 103 | 104 |
| W#1 shot angle (°) | 10.7 | 10.8 | 10.9 | 10.8 | 11.0 | 11.1 |
| W#2 spin rate (rpm) | 2500 | 2350 | 2380 | 2450 | 2280 | 2300 |
| Flight distance Index | 100 | 101 | 103 | 102 | 103 | 104 |
| Abrasion resistance | G | G | G | G | G | G |

Golf balls Nos. 1 to 6 each satisfied the requirements of the present invention as to the outer diameter of the core, the surface hardness of each of the core and the center, the composition and thickness of the polyurethane cover, and the like. Every golf ball (Nos. 1 to 6) exhibited a large repulsion index, large carry index, high shot angle and low spin rate and was excellent in flight distance.

TABLE 5

| Golf ball No. | 7 | 8 | 9 | 10 | 11 | 12 | 13 |
|---|---|---|---|---|---|---|---|
| Center | — | — | — | — | — | — | — |
| Type of Center | S1 | S1 | S1 | S2 | S3 | S4 | S1 |
| Surface hardness (Shore D) | 52 | 52 | 52 | 58 | 50 | 50 | 52 |
| Hardness difference (Surf.-Cent.) | 19 | 19 | 19 | 21 | 3 | 13 | 19 |
| Core | — | — | — | — | — | — | — |

TABLE 5-continued

| Golf ball No. | 7 | 8 | 9 | 10 | 11 | 12 | 13 |
|---|---|---|---|---|---|---|---|
| Type of Intermediate Layer | M1 | M1 | M1 | M3 | M2 | M1 | M4 |
| Outer diameter (mm) | 41.2 | 41.2 | 40.0 | 40.4 | 41.2 | 41.2 | 41.2 |
| Surface hardness (Shore D) | 60 | 60 | 58 | 70 | 57 | 60 | 52 |
| Hardness difference (Surf.-Cent.) | 27 | 27 | 25 | 33 | 10 | 23 | 19 |
| Deformation (mm) | 2.80 | 2.80 | 2.90 | 2.80 | 3.00 | 2.65 | 2.90 |
| Cover | — | — | — | — | — | — | — |
| Type of Cover | C3 | C4 | C2 | C2 | C2 | C2 | C2 |
| Thickness (mm) | 0.8 | 0.8 | 1.4 | 1.2 | 0.8 | 0.8 | 0.8 |
| Slab hardness (Shore D) | 52 | 53 | 47 | 47 | 47 | 47 | 47 |
| Ball properties | — | — | — | — | — | — | — |
| Deformation (mm) | 2.60 | 2.55 | 2.75 | 2.70 | 2.90 | 2.55 | 2.80 |
| Repulsion Index | 98 | 97 | 95 | 98 | 97 | 100 | 99 |
| W#1 shot angle (°) | 10.3 | 10.4 | 10.4 | 10.5 | 10.3 | 10.6 | 10.5 |
| W#1 spin rate (rpm) | 2400 | 2300 | 2500 | 2400 | 2300 | 2500 | 2600 |
| Flight distance Index | 97 | 96 | 96 | 98 | 97 | 99 | 98 |
| Abrasion resistance | F | P | G | G | G | G | G |

Golf ball No. 7 exhibited lowered abrasion resistance due to the non-uniform curing reaction of the urethane cover composition, because an isocyanate group-terminated urethane prepolymer having a residual isocyanate monomer content of more than 0.1% was used for golf ball No. 7.

Golf ball No. 8 is the case where the thermoplastic polyurethane was used as the polyurethane cover. The abrasion resistance of Golf ball No. 8 was inferior to that of the polyurethane cover used in the present invention. From this result, it is considered that the polyurethane cover used in the present invention is superior to a thermoplastic polyurethane cover in abrasion resistance because of the overall factors that the polyurethane cover used in the present invention tends to have a three-dimensional crosslinking structure via buret crosslinking; the use of the aromatic polyamine compound as a curing agent provides for the polyurethane having a high cohesive strength; and the curing reaction proceeds homogeneously. Golf balls Nos. 9 and 10 have the polyurethane cover thicknesses of 1.4 mm and 1.2 mm, respectively. Since the polyurethane cover of either golf ball was too thick, the repulsion property was lowered, resulting in a shorter flight distance.

In Golf ball No. 11, the difference in hardness between the surface portion and the central portion of the core was 10, and the difference in hardness between the surface portion and the central portion of the center was as small as 3. Thus, golf ball No. 11 exhibited a shorter flight distance, because the sufficient repulsion property was not imparted to the golf ball. In golf ball No. 12, the hardness difference is less than 15 between the surface hardness and the central hardness of the center, while the hardness difference between the surface hardness and the central hardness of the core was not less than 20. To the contrary, in golf ball No. 13, the hardness difference is not less than 15 between the surface hardness and the central hardness of the center, while the hardness difference is less than 20 between the surface hardness and the central hardness of the core. In either case, the repulsion property of the core or the center was lowered, resulting in a reduced flight distance. These results indicated that the satisfactory flight distance is not ensured by a golf ball which does not meet any one of the requirements that: the difference between the surface hardness and the central hardness of the core is not less than 20; and that the difference between the surface hardness and the central hardness of the center is not less than 15.

According to the present invention it is possible to impart such characteristics as a high repulsion property, high shot angle and low spin rate to the golf ball, thereby increasing the flight distance of the golf ball, by increasing the diameter of the core of the golf ball and providing the core with the difference in hardness between the surface portion and the central portion. The difference in hardness between the surface portion and the central portion of the core can be easily provided if the core is made to have a multi-layered structure. Further, by adjusting the thicknesses and compositions of the center and the intermediate layer, it is possible to widen the degree of freedom in providing a hardness distribution thereby to provide a considerably large difference in hardness between the central portion and the surface portion of the core.

Since the isocyanate group-terminated urethane prepolymer having a residual isocyanate monomer content of not more than 0.1% by mass is used to form the polyurethane cover of the multi-piece golf ball of the present invention, the urethane cover composition does not generate any precipitate during the curing, and hence, the resulting cover is excellent in abrasion resistance and durability. Further, since the polyurethane cover is formed from a two-part curing type polyurethane comprising the aforementioned urethane prepolymer and an aromatic polyamine compound with a highly cohesive energy, the resulting polyurethane also has an enhanced cohesive strength. Furthermore, the polyurethane cover has a three-dimensional crosslinking structure via buret crosslinking, and hence has a superior abrasion resistance to the thermoplastic polyurethane cover and like covers.

This application is based on Japanese Patent application No. 2001-307885 filed on Oct. 3, 2001, the contents of which are hereby incorporated by reference.

What is claimed is:

1. A multi-piece golf ball comprising
   a core including a center and at least one intermediate layer covering the center; and
   a polyurethane cover covering the core; wherein the polyurethane cover has a thickness of not more than 1 mm and is formed from a cured composition which contains an isocyanate group-terminated urethane prepolymer having an isocyanate component derived from at least one isocyanate compound selected from the group consisting of tolylene diisocyanate, 4,4'-diphenylmethane diisocyanate, and 4,4'-dicyclohexylmethane diisocyanate and having a residual polyisocyanate monomer content of not more than 0.1% by mass and an aromatic polyamine compound; and
   the core has an outer diameter of from 40.8 mm to 42.2 mm;

a difference in Shore D hardness between the central portion and the surface portion of the center is not less than 1.5;

a difference in Shore D hardness between the central portion and the surface portion of the core is not less than 20; and a Shore D hardness at the surface portion of the core is higher than a Shore D hardness at the surface portion of the center, and the center has a deformation amount of from 2.80 mm to 4.00 mm when applying a load varying from 98 N as an initial load to 1275 N as a final load to the center.

2. The multi-piece golf ball according to claim 1, wherein the aromatic polyamine compound is 4,4'-diaminodiphenylmethane or a derivative thereof represented by the formula:

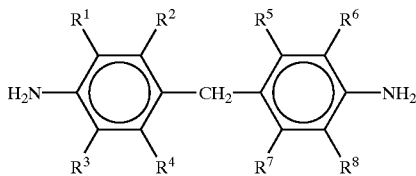

where $R^1$ to $R^8$ each represent any one of an alkyl group having 1 to 9 carbon atoms, a halogen atom and a hydrogen atom.

3. The multi-piece golf ball according to claim 1, wherein the aromatic polyamine compound is 2,2'-dichloro-3,3',5,5'-tetraethyl-4,4'-diaminodiphenylmethane.

4. The multi-piece golf ball according to claim 1, wherein:
the cured composition has a Shore D hardness of from 35 to 60; and
the golf ball has the deformation amount of from 2.50 mm to 3.20 mm when applying a load varying from 98 N as an initial load to 1275 N as a final load to the golf ball.

5. The multi-piece golf ball according to claim 1, wherein the core has a deformation amount of from 2.70 mm to 3.50 mm when applying a load varying from 98 N as an initial load to 1275 as a final load to the core.

6. The multi-piece golf ball according to claim 1, wherein the center becomes softer towards the central portion thereof.

7. The multi-piece golf ball according to claim 1, wherein the center has a Shore D hardness of from 30 to 50 at the central portion and a Shore D hardness of from 45 to 75 at the surface portion.

8. A multi-piece golf ball comprising
a core including a center and at least one intermediate layer covering the center; and a polyurethane cover covering the core, wherein the polyurethane cover has a thickness of not more than 1 mm and is formed from a cured composition which contains an isocyanate group-terminated urethane prepolymer having a residual polyisocyanate monomer content of not more than 0.1% by mass and 2,2'-dichloro-3,3',5,5'-tetraethyl-4,4'-diaminodiphenylmethane; and the core has an outer diameter of from 40.8 mm to 42.2 mm;

a difference in Shore D hardness between the central potion and the surface portion of the center is not less than 15;

a difference in Shore D hardness between the central portion and the surface portion of the core is not less than 20; and a Shore D hardness at the surface portion of the core is higher than a Shore D hardness at the surface portion of the center, and the center has a deformation amount of from 2.80 mm to 4.00 mm when applying a load varying from 98 N as an initial load to 1275 as a final load to the center.

9. The multi-piece golf ball according to claim 8, wherein the isocyanate group-terminated urethane prepolymer has an isocyanate component derived from at least one isocyanate compound selected from the group consisting of tolylene diisocyanate, 4,4'-diphenylmethane diisocyanate, and 4,4'-dicyclohexylmethane diisocyanate.

10. The multi-piece golf ball according to claim 8, wherein:
the cured composition has a Shore D hardness of from 35 to 60; and
the golf ball has the deformation amount of from 2.50 mm to 3.20 mm when applying a load varying from 98 N as an initial load to 1275 N as a final load to the golf ball.

11. The multi-piece golf ball according to claim 8, wherein the core has a deformation amount of from 2.70 mm to 3.50 mm when applying a load varying from 98 N as an initial load to 1275 N as a final load to the core.

12. The multi-piece golf ball according to claim 6, wherein the center softer towards the central portion thereof.

13. The multi-piece golf ball according to claim 8, wherein the center has a Shore D hardness of from 30 to 50 at the central portion and a Shore D hardness of from 45 to 75 at the surface portion.

* * * * *